Dec. 18, 1928.
T. A. MORGAN ET AL
1,695,774
TRANSMISSION AND FOLLOW-UP SYSTEM FOR GYROCOMPASSES
Filed Jan. 25, 1922      3 Sheets-Sheet 2
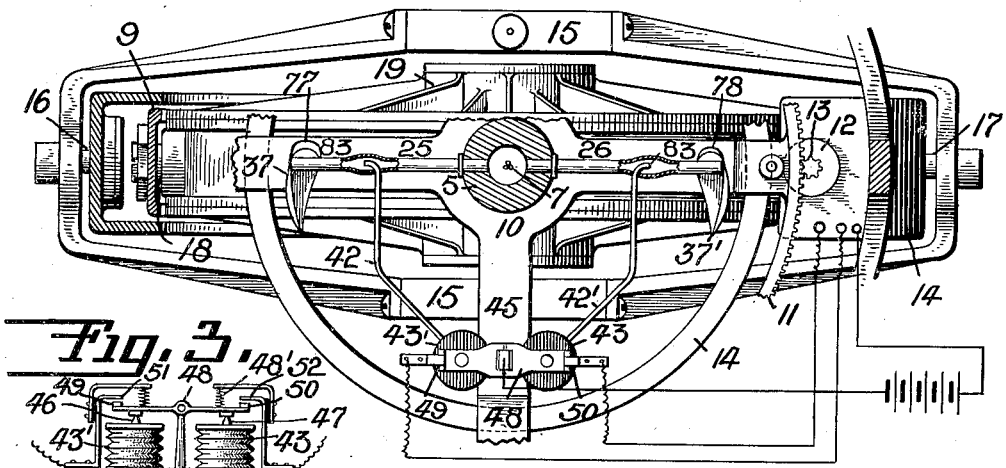
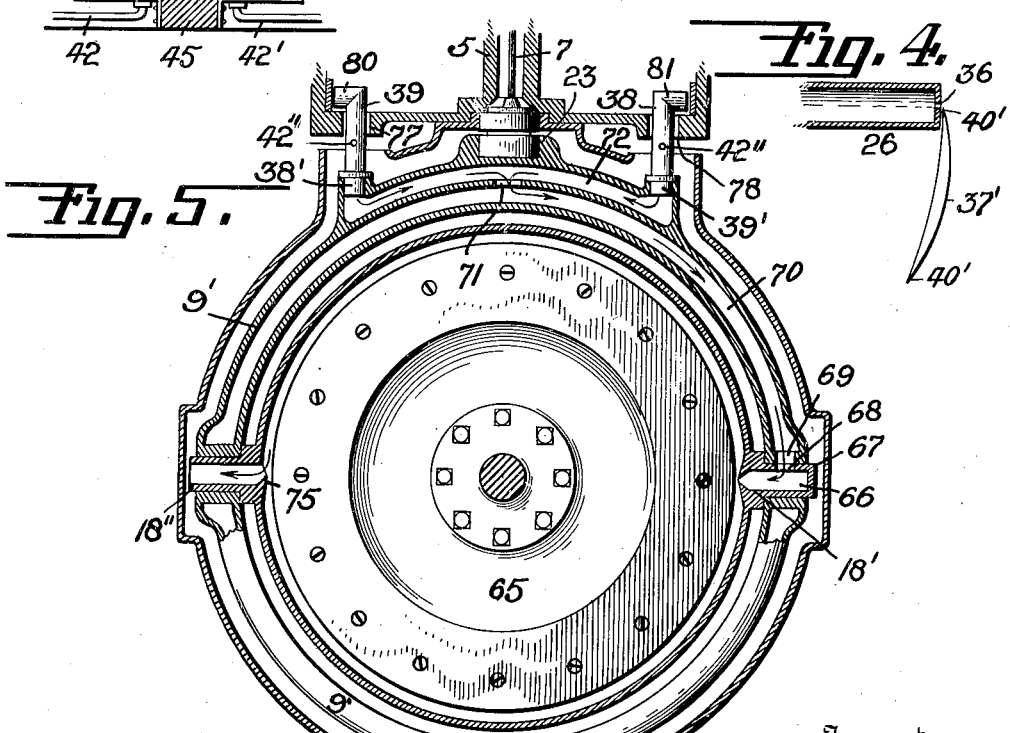
Inventor
Thomas A. Morgan &
Herbert H. Thompson
By their Attorney
Herbert H. Thompson

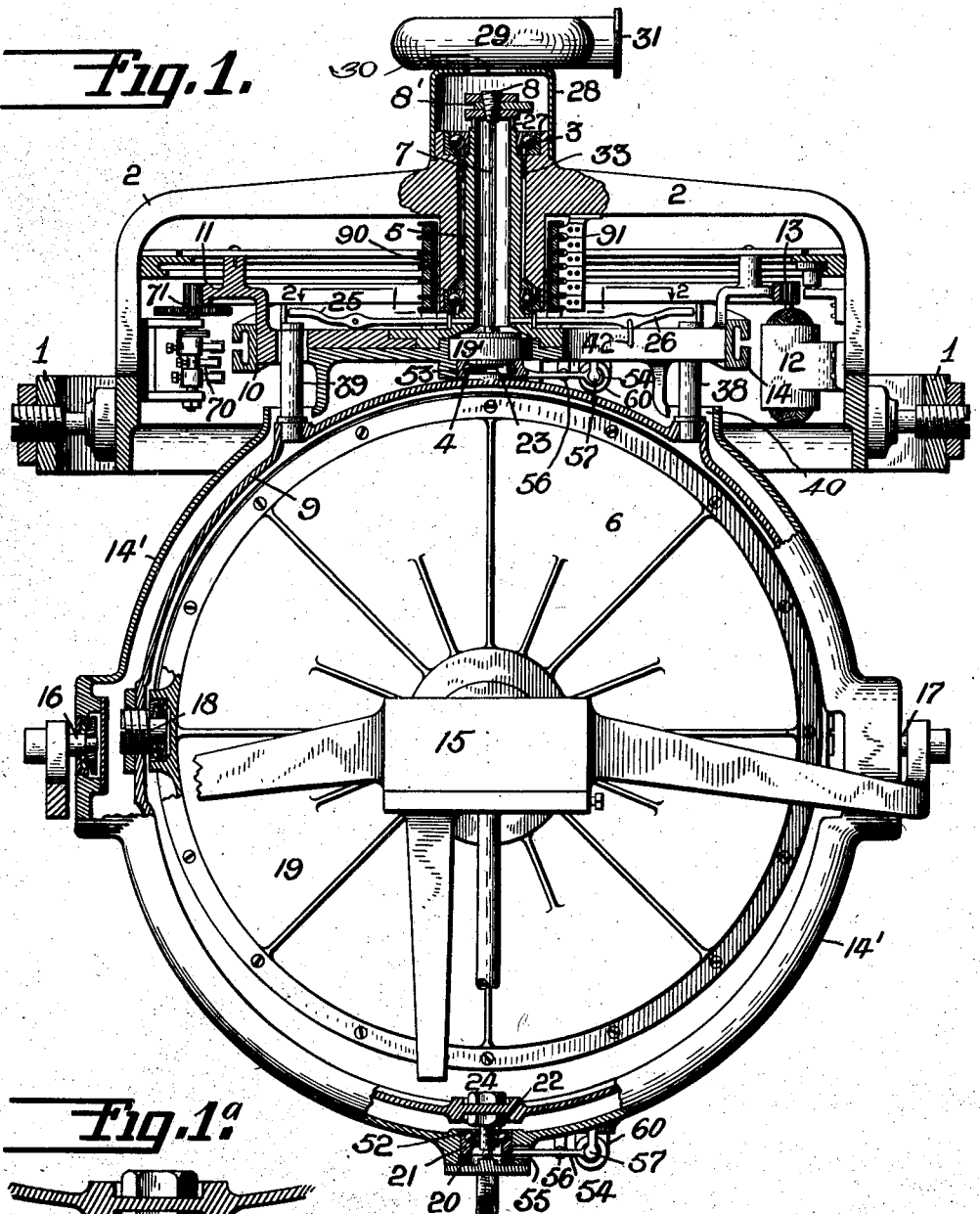

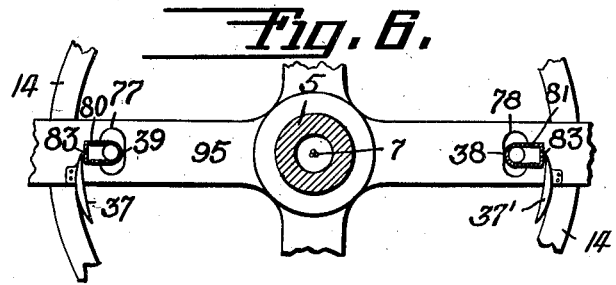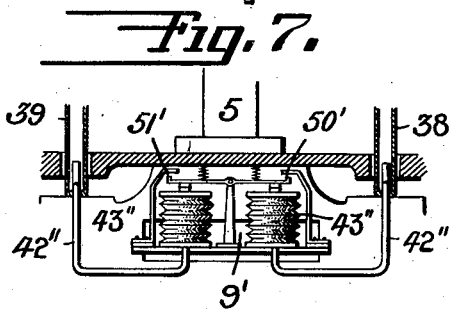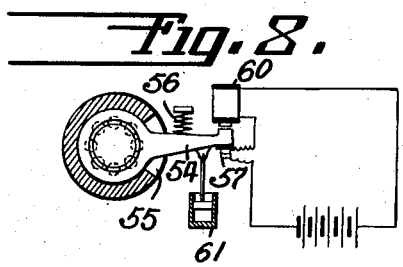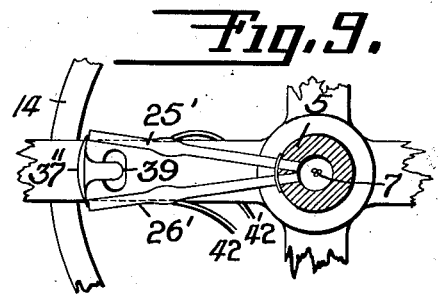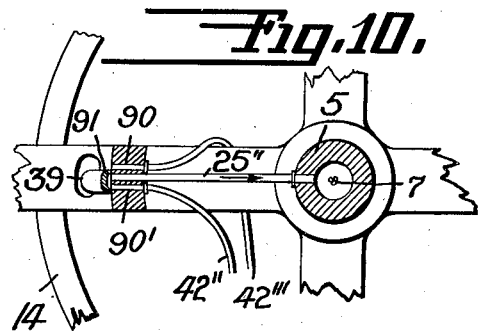

Patented Dec. 18, 1928.

1,695,774

UNITED STATES PATENT OFFICE.

THOMAS A. MORGAN AND HERBERT H. THOMPSON, OF BROOKLYN, NEW YORK, ASSIGNORS TO THE SPERRY GYROSCOPE COMPANY, OF BROOKLYN, NEW YORK, A CORPORATION OF NEW YORK.

TRANSMISSION AND FOLLOW-UP SYSTEM FOR GYROCOMPASSES.

Application filed January 25, 1922. Serial No. 531,748.

This invention relates especially to gyroscopic compasses having means to transmit to a distance the readings of the master compass. The preferred construction of gyroscopic compasses at present employs in connection with the sensitive or gyroscopic element, a follow-up element which follows every movement of the sensitive element in azimuth, said follow-up element being driven by power driven means which is responsive to the movements of the sensitive element. The follow-up element serves to actuate directly or indirectly the repeating system for transmitting the readings of the compass to a distance, and preferably also, acts as a follow-up support for the sensitive element, thereby relieving the sensitive element of most of the friction about the vertical axis.

The objects of the invention are to improve upon the present method of driving the follow-up element or support, whereby all causes of friction between the support and sensitive element are removed. It is now the practice to actuate the follow-up support by electrical contacts operating between the element and the support (see patent to Sperry 1,300,890 dated April 15, 1919), usually in the form of a trolley which rolls across the reversing contacts. While said trolley causes very little friction, at the same time, as the trolley must necessarily engage the contacts and as the present practice is to continually oscillate the follow-up element, some friction necessarily results, although negligible in compasses of large directive power.

A further object of the invention is to eliminate the continuous oscillation of the follow-up support now employed in the Sperry compass and described in said Sperry patent. Said oscillation, or hunting action, is employed principally to eliminate the static friction of the bearings between the follow-up support and the sensitive element. While accomplishing this function successfully, it introduces other features which are regarded as objectionable by some. Thus, the oscillation of the follow-up support causes continuous oscillation of the repeater compasses. Also, the continuous slight twisting of the suspension wires of the sensitive element somewhat lessens their life.

A further object of the invention therefore, is to provide means for maintaining the continuous oscillation of the bearings without causing hunting of the repeaters, or fatigue of the suspension wires.

Referring to the drawings in which what we now consider the preferred forms of our invention are shown, Fig. 1 is a side elevation, partly in section, of a gyroscopic compass constructed according to our invention, parts non-essential to illustration of the invention being omitted.

Fig. 1ª is an enlarged sectional detail of the lower thrust and guide bearing shown in Fig. 1.

Fig. 2 is a top sectional view through the vertical spindle on line 2—2 of Fig. 1.

Fig. 3 is a detail side view of the air actuated relay for controlling the follow-up motor.

Fig. 4 is an enlarged view of the end of one of the pipes showing the nozzle.

Fig. 5 is a vertical sectional view of the compass casing and supporting rings, showing a modified form of the invention.

Fig. 6 is a diagrammatic plan view showing the air system of Fig. 5.

Fig. 7 is a side view of the relay employed in connection with Figs. 5 and 6.

Fig. 8 is a sectional detail of the oscillating means for the guide bearings of the compass.

Figs. 9 and 10 are diagrammatic views of modified forms of air actuation of the follow-up system.

The compass illustrated is shown as supported in the usual gimbal ring 1 by spider 2. Journalled in said spider in upper and lower ball bearings 3 and 4 is a hollow spindle 5 forming a part of the follow-up support. Said spindle serves to support the sensitive element 6 of the compass. As shown, the sensitive element is suspended by means of a bundle of fine wires 7, secured in wedge 8, supported by any suitable means 8' at the top of said spindle. The bottom of said wires is secured to and supports the vertical ring 9 of the sensitive element. The follow-up element is shown as comprising a rotatable element 10, on which the spindle 5 is mounted. On said element is also mounted the slip rings 90 for leading current into the compass, the co-operating brushes 91 being secured to spider 2. Said element 10 is shown as carrying the gear 11 by which the element is driven from the motor 12 through suitable gearing 13. The correction cam ring is shown at 14. The follow-up element also extends downwardly in the form of a phantom or ring 14', surrounding the vertical ring 9. Said phantom may support mercury boxes 15, which act to impart meridian seeking properties to the compass, as will be readily understood by those skilled in the art. The mercury boxes are shown as supported by bearings 16 and 17 substantially in line with, or slightly below horizontal bearings 18 of the gyro casing 19 in the vertical ring 9. At the top and bottom, the vertical ring of the sensitive element is guided in guide bearings 19' and 20 in the follow-up element. Both bearings are shown as of the anti-friction or ball bearing type with outer races 21 and inner races 22. In both instances, the inner race is shown as secured to extensions 23 and 24 from the vertical ring. The special construction of these bearings and the reason therefor, will be described hereinafter.

The gear 11 also serves to actuate the transmitter 70 through reduction gearing 71, by means of which the readings of the compass are transmitted to a distance.

Instead of employing trolleys between the sensitive and follow-up elements, we prefer to employ a frictionless, air-actuated system. In the preferred form of the invention, we mount on the follow-up element, a pair of oppositely extending tubes or air passages 25 and 26. Means are provided to cause an air flow through said tubes, preferably by drawing air therethrough by suction. For this purpose, we have shown each tube as communicating with the interior of the hollow spindle 5 and we have provided means for continuously drawing air through said spindle. For this purpose, apertures 27 are provided at the top of the spindle and the whole is covered by a cap 28, on which may be mounted a small electrically driven blower 29, which draws air continuously through the opening 30 in the cap and expels the same through nozzle 31. It will be observed that the said motor and cap are on a stationary part of the compass, i. e., the spider 2, so that no reaction of any sort will be exerted on the compass. In case air is found to leak into said cap through the guide bearings 3 and 4, suitable packing 33 between the stem and the spider may be provided. It is not necessary to have the same absolutely air tight, however, as all that is necessary is that a pressure slightly below that of the atmosphere be maintained in the system.

Each tube 25 and 26 has a narrow vertical slot 36 at the end thereof, through which air is adapted to be drawn. Also the end is preferably convex about the vertical axis of the gyroscope. It will be readily apparent that if the slots are equally opened or equally closed, that the amount of air flowing through each tube and the pressure in each tube will be the same. Cooperating with said slots is a pair of sectors 37 and 37' which are mounted on posts 38, 39, secured to the vertical ring 9 and rising through slots 40 in the follow-up ring. Said sectors have their inner surfaces carefully machined with the vertical axis of the gyroscope as their center of curvature and are provided with vertical knife edges 40'. The segments act as differential valves, so that on relative rotation of the sensitive and follow-up elements in one direction, the segments will open one port and close the opposite port while on rotation in the other direction, the reverse will occur. By making the clearance between the segment and the port very small, extreme sensitiveness may be secured, without any reaction on the sensitive element whatever. By positioning the ports oppositely, any reaction of the air would be balanced by an opposite reaction on the other side. Sufficient differential air pressure in the tubes is found to be secured by relative rotation of the parts through an arc of one minute or less to actuate the system. The system also is self centering, i. e., it is immaterial whether the ports are exactly the same size, or the clearances exactly the same, since the follow-up element will always be maintained in that position which causes equal flow through the tubes.

Connected with the tubes 25, 26 preferably near the ends thereof, is a second pair of tubes 42, 42', which serve to transmit the pressure within the main tubes (either static or dynamic) to a differential relay. As shown, said second tubes enter the larger tubes 25 and 26 and have their open ends 83 facing the ports in the larger tubes, so that pressure within the smaller tubes will be responsive to the velocity of flow of air through the larger tubes. Tube 42 is shown as connected to a sylphon or miniature metallic bellows 43', while the other tube is connected to a second sylphon 43. Two sylphons are mounted on part of the follow-up element such as arm 45, and are provided with points 46, 47 bearing against the opposite ends of the pivoted lever 48, which is yieldingly centralized by springs 48'. It will be readily apparent that as long as the pressures in said sylphons are equal, that said lever will be horizontal, but that any relative variations in pressure in the sylphons will tilt the lever to bring one or the other of contacts 49 or 50 mounted thereon into contact with stationary contacts 51 and 52.

Said contacts preferably actuate directly or indirectly, the reversible follow-up motor 12, which rotates directly or indirectly the follow-up element. By this system a sensitive follow-up means is effected without causing a hunting action on the follow-up support, but it will of course be understood that a hunting action may be employed if desired, by means such as described in said Sperry patent. In order to maintain freedom of the bearings however, without resorting to said hunting action, we prefer to relatively oscillate the parts of the guide bearings 19', 20. For this purpose, we have shown the outer race 21 of each bearing as rotatably mounted in the follow-up support, in plain bearings 52, 53. The lower ring is shown as held in place between shoulder 95 and a nut 96 threaded in an aperture in the phantom 14'. Said ring or race is shown as provided with a laterally extending arm 54, extending through a slot 55 in the follow-up element. Said arm is yieldingly held in one direction by the compression spring 56 and when in such position closes a pair of contacts 57. When so closed, the electromagnet 60, also mounted on the follow-up element is excited serving to attract said arm 54 and rotate the same against the action of the spring. Said rotation also breaks the contact, so that the oscillatory action becomes continuous. In order to prevent too rapid or violent action, we have shown a double acting dash pot 61, pivoted to the arm to retard the oscillation.

In the form of the invention shown in Figs. 5, 6 and 7, the air pressure or suction as the case may be, is secured from the gyro wheel itself, thus avoiding the necessity of employing an auxiliary blower. We prefer in this case also to employ positive, rather than negative air pressure. As before, the follow-up ring is shown at 14', the vertical ring at 9' and the gyro case at 19, all of said parts being shown in section, thus showing the gyro rotor 65 within the case. As said rotor revolves, it carries around with it at high velocity, a film of air between it and the case. By reducing the clearance between the case and the wheel at one of the horizontal bearings 18', we create negative pressure, by a Venturi tube action. At this point, we provide an aperture 66 in the said casing, which leads into the hollow trunnion 67 secured to the casing. Said trunnion has an aperture 68 registering with an aperture 69 in a vertical ring. In this instance, the vertical ring is formed with a double wall, thereby providing a passageway 70 therethrough. Said passageway is provided with a central aperture 71 leading into a second passageway 72, which communicates at opposite ends with the posts 38', 39', which in this instance, are hollow.

It will be readily seen that by this construction, air will be drawn downwardly in the direction of the arrows through the passage 70 and into the gyro case, thereby drawing air equally through the hollow posts 38', 39'. The air thus drawn into the case is taken out again through the hollow trunnion 18'', baffle lip 75 being provided, if desired, to direct the air through said hollow trunnion. The two posts rise upwardly through the follow-up element, but in this instance, the posts are equipped with outwardly directed ends 80 and 81, which are provided with vertical slots 83, similar to the slots 36. In this instance, the cooperating sectors 37, 37' are mounted on arm 95 of the follow-up support, the action being similar to that described in connection with Fig. 1.

The differential pressure in the posts is utilized in this instance by tapping in the posts, smaller tubes 42'', as before, which lead to differential sylphons 43'', mounted on the vertical ring 9'. Said sylphons act to close contacts 50', 51' as before, the circuit through said contacts being led to the azimuth motor through the usual flexible wires and slip rings 90 (see Fig. 1), and brushes 91.

It is of course obvious that our invention is not limited to the means for creating differential air pressure by relative rotation of the two elements already described. For instance in Fig. 9 is shown a scheme similar to that of Fig. 1, except that both differential tubes 25', 26' are on the same side of the compass and a single valve member 37'' cooperates with both. The action is otherwise the same as already described.

In Fig. 10, a somewhat different valve arrangement is shown. Here the blower is connected to but a single tube 25'' on the follow-up element. Ports 90 and 90' are arranged on each side of the end of tube 25'', while a slide valve 91 connected to post 39 of the sensitive element serves to connect said tube 25'' with either said port 90 or 90' dependent upon the relative movement between the two elements. It will be understood that pipes 42'' and 42''' are connected to a suitable differential air pressure responsive means, such as hereinbefore described.

In accordance with the provisions of the patent statutes, we have herein described the principle of operation of our invention, together with the apparatus, which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted, without interfering with the more general results outlined and the invention extends to such use.

Having herein described our invention, what we claim and desire to secure by Letters Patent is, 1. In a gyroscopic compass, the combination with the sensitive element, of means for transmitting to a distance the readings thereof, comprising a power driven element, a transmitter, there being a plurality of ports on one of said elements, means for drawing air through said ports, cooperating valves on said elements to vary the relative amount of air flowing through the ports on relative rotation of the elements, and means controlled by the variations in the flow of air through the respective ports for rotating said transmitter and the second mentioned element.

2. In a gyro-compass, the combination with the sensitive element, of means for transmitting the readings thereof to a distance comprising a follow-up element, means for rotating the same, normally balanced air pressure means for controlling said rotating means to render the same effective when the balance is disturbed, means for disturbing said pressure balance upon relative rotation of said sensitive and follow-up elements, and transmitting means driven by said follow-up element.

3. In a gyro compass, the combination with the support and the sensitive and follow-up elements, a hollow guide mounted on said follow-up element and journaled in said support for mounting the follow-up element for rotation about a vertical axis, means whereby the former element is pivotally supported on the latter for independent movement about the axis of the latter, means for causing a flow of air through said guide, means for actuating the follow-up from the sensitive element, and differential air-flow means connected to said guide brought into action by relative movement between said elements for controlling said actuating means.

4. In a gyro compass, the combination with the support and the sensitive and follow-up elements, a hollow guide for mounting the latter element for rotation about a vertical axis, means whereby the former element is pivotally supported on the latter for independent movement about the axis of the latter, means mounted on said support for withdrawing air from said guide, means for actuating the follow-up from the sensitive element, and differential air-flow means connected to said guide, the pressure balance of which is disturbed by relative movement between said elements for controlling said actuating means.

5. In a gyroscopic compass, the combination with the sensitive element, of means for transmitting to a distance the readings thereof, comprising a power driven follow-up supporting element, a transmitter, there being a plurality of ports on one of said elements, means for drawing air through said ports, cooperating valves on the other of said elements to vary the relative amount of air flowing through the ports on relative rotation of the elements, means for rotating said transmitter and said second mentioned element, and means actuated by the variations in the flow of air for controlling said rotating means.

6. In a gyroscopic compass, the combination with the sensitive element, of a follow-up support therefor, air actuated means for causing said support to follow the rotation of the sensitive element, a guide bearing between the element and support, and means for imparting to the several parts of the bearing, continuous relative movement independent of the movements of the support.

7. In a gyroscopic navigational instrument, the combination with the sensitive element, of means for transmitting the readings thereof to a distance including a power driven element, a transmitter, there being a pair of oppositely disposed ports on one of said elements, means for drawing air through said ports, a shutter for each of said ports on the other of said elements, having a vertical knife edge, means for rotating said transmitter and said second mentioned element, and means actuated by the variations in the relative flow of air through each port caused by relative movement between said elements for controlling said rotating means.

8. In a gyroscopic navigational instrument, the combination with the sensitive and follow-up elements having a common center of rotation, of means for actuating the latter from the former comprising means forming a pair of air ports on one of said elements, means causing a flow of air through said ports, a knife edge segment curved to the centre of rotation of said elements for the ports moved by the other of said elements, means for rotating the follow-up element, and means actuated by the change in relative flow of air through each port caused by relative movement between said elements, for controlling said rotating means.

9. In a gyro compass, the combination with the support and the sensitive and follow-up elements, a hollow guide for mounting the latter element for rotation about a vertical axis, means whereby the former element is pivotally supported on the latter for independent movement about the axis of the latter, means for causing a flow of air through said guide, a differential air pressure relay, differential air-flow means connected to said guide and relay, and means on said sensitive and follow-up elements respectively for disturbing the air-flow upon relative movement between said elements and means actuated thereby for turning said sensitive element.

In testimony whereof we have affixed our signatures.

THOMAS A. MORGAN.
HERBERT H. THOMPSON.